(12) United States Patent
Qin et al.

(10) Patent No.: US 9,983,339 B2
(45) Date of Patent: May 29, 2018

(54) POLARIZER HAVING METAL GRATING, ITS MANUFACTURING METHOD AND DISPLAY DEVICE

(71) Applicant: BOE TECHNOLOGY GROUP CO., LTD., Beijing (CN)

(72) Inventors: Guangkui Qin, Beijing (CN); Zhen Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 100 days.

(21) Appl. No.: 15/096,708

(22) Filed: Apr. 12, 2016

(65) Prior Publication Data

US 2016/0299274 A1    Oct. 13, 2016

(30) Foreign Application Priority Data

Apr. 13, 2015   (CN) .......................... 2015 1 0173973

(51) Int. Cl.
```
G02B 5/30      (2006.01)
G02B 1/14      (2015.01)
B82Y 20/00     (2011.01)
B82Y 40/00     (2011.01)
```
(52) U.S. Cl.
CPC ............. *G02B 5/3058* (2013.01); *G02B 1/14* (2015.01); *B82Y 20/00* (2013.01); *B82Y 40/00* (2013.01); *Y10S 977/762* (2013.01); *Y10S 977/783* (2013.01); *Y10S 977/81* (2013.01); *Y10S 977/887* (2013.01); *Y10S 977/89* (2013.01); *Y10S 977/895* (2013.01); *Y10S 977/902* (2013.01)

(58) Field of Classification Search
CPC .......... G02B 1/00; G02B 5/18; G02B 5/1809; G02B 5/1861; G02B 5/1866; G02B 5/30; G02B 5/3025; G02B 5/3058; G02B 27/28; G02B 27/42; G02B 27/4261
USPC ............ 359/483.01, 485.01, 485.05, 487.01, 359/487.03, 489.01, 489.06, 566, 569, 359/572, 574, 576; 362/19; 353/20
See application file for complete search history.

(56) References Cited

U.S. PATENT DOCUMENTS

2009/0059367 A1* 3/2009 O'Malley ............ G02B 5/3058
                                                    359/487.01
2013/0126468 A1   5/2013 Kim et al.
2016/0027963 A1*  1/2016 Jun .......................... H01L 33/06
                                                    257/13

FOREIGN PATENT DOCUMENTS

| CN | 101779186 A | 7/2010 |
| CN | 102565909 A | 7/2012 |
| CN | 103197366 A | 7/2013 |
| CN | 103984055 A | 8/2014 |

OTHER PUBLICATIONS

First Office Action regarding Chinese application No. 201510173973.X, dated Aug. 2, 2016. Translation provided by Dragon Intellectual Property Law Firm.

* cited by examiner

*Primary Examiner* — Arnel C Lavarias
(74) *Attorney, Agent, or Firm* — Harness, Dickey & Pierce, P.L.C.

(57) ABSTRACT

A polarizer that includes a substrate, and a metal grating formed on the substrate that includes a metal nano-wire array arranged in a predetermined direction.

16 Claims, 2 Drawing Sheets

POLARIZER HAVING METAL GRATING, ITS MANUFACTURING METHOD AND DISPLAY DEVICE

CROSS-REFERENCE TO RELATED APPLICATION

The present application claims a priority of the Chinese Patent Application No. 201510173973.X filed on Apr. 13, 2015, which is incorporated herein by reference in its entirety.

TECHNICAL FIELD

The present disclosure relates to the field of display technology, in particular to a polarizer, its manufacturing method and a display device.

BACKGROUND

Both a conventional liquid crystal display (LCD) and a novel organic light-emitting diode (OLED) display include a polarizer, and usually a short-wavelength reflective polarizer includes a metal grating. However, it is impossible to provide the metal grating with a sufficiently small size, so a polarization effect will be adversely affected.

SUMMARY

An object of the present disclosure is to provide a polarizer, its manufacturing method and a display device, so as to provide a metal grating with a sufficiently small size, thereby to improve a polarization effect.

In one aspect, the present disclosure provides in some embodiments of the present disclosure a polarizer, including: a substrate, and a metal grating formed on the substrate and including a metal nano-wire array arranged in a predetermined direction.

Alternatively, a transparent protective film is attached to at least one side of the metal grating, and the transparent protective film is made of triacetate cellulose (TAC) or polymethyl methacrylate (PMMA).

Alternatively, metal nano-wires in the metal nano-wire array are doped into a transparent medium film.

Alternatively, the transparent medium film is made of polyvinyl alcohol (PVA).

Alternatively, a transparent alignment film having an alignment pattern is coated on the substrate.

Alternatively, the transparent alignment film is made of polyvinyl pyrrolidone (PVP).

Alternatively, the metal nano-wire array is formed on the substrate in accordance with the alignment pattern.

Alternatively, the substrate is a base substrate, an array substrate or a color filter substrate.

Alternatively, the metal nano-wire is made of silver, copper, gold or aluminium nano particles.

In another aspect, the present disclosure provides in some embodiments a method for manufacturing a polarizer, including steps of: providing a substrate; and forming on the substrate a metal grating including a metal nano-wire array arranged in a predetermined direction.

Alternatively, the step of forming on the substrate the metal grating including the metal nano-wire array arranged in the predetermined direction includes: generating metal nano-wires through a chemical growth method; forming the metal nano-wires on the substrate through spinning or printing; and aligning on the substrate the metal nano-wires in the predetermined direction, thereby forming the metal grating including the metal nano-wire array arranged in the predetermined direction.

Alternatively, the step of aligning on the substrate the metal nano-wires in the predetermined direction, thereby forming the grating metal including the metal nano-wire array includes: curing the metal nano-wires; and drawing and aligning the cured metal nano-wires, thereby forming the metal grating including the metal nano-wire array.

Alternatively, the step of aligning on the substrate the metal nano-wires in the predetermined direction, thereby forming the grating metal including the metal nano-wire array includes: enclosing the metal nano-wires with a polarized organic material; subjecting the metal nano-wires on the substrate to induced alignment under the effect of an electric field; and curing the aligned metal nano-wires, thereby forming the metal grating including the metal nano-wire array.

Alternatively, the step of forming on the substrate the metal grating including the metal nano-wire array in the predetermined direction includes: coating a transparent medium film doped with the metal nano-wires onto the substrate; and aligning the metal nano-wires in the transparent medium film in the predetermined direction, thereby forming the metal grating including the metal nano-wire array.

Alternatively, the transparent medium film is made of PVA.

Alternatively, the step of forming on the substrate the metal grating including the metal nano-wire array in the predetermined direction includes: forming on the substrate a transparent alignment film having an alignment pattern; generating the metal nano-wires on the substrate in accordance with the alignment pattern through a chemical growth method; and curing the metal nano-wires, thereby forming the metal grating including the metal nano-wire array.

Alternatively, the transparent alignment film is made of PVP.

Alternatively, the metal nano-wires are made of silver nano particles, and the step of generating the metal nano-wires through a chemical growth method includes: generating the silver nano particles from a silver nitrate solution, with ethylene glycol as a reducing agent; and forming the metal nano-wires using the silver nano particles, with PVP as an aligning agent and a stabilizer.

Alternatively, a distance between the metal nano-wires in the metal nano-wire array is controlled in accordance with a concentration of nano particles and an ink thickness during the printing.

In yet another aspect, the present disclosure provides in some embodiments a display device including the above-mentioned polarizer.

According to the embodiments of the present disclosure, the metal grating includes the metal nano-wire array arranged in the predetermined direction. Through the metal nano-wires, it is able to provide the metal grating with a sufficiently small size, thereby to improve the polarization effect.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
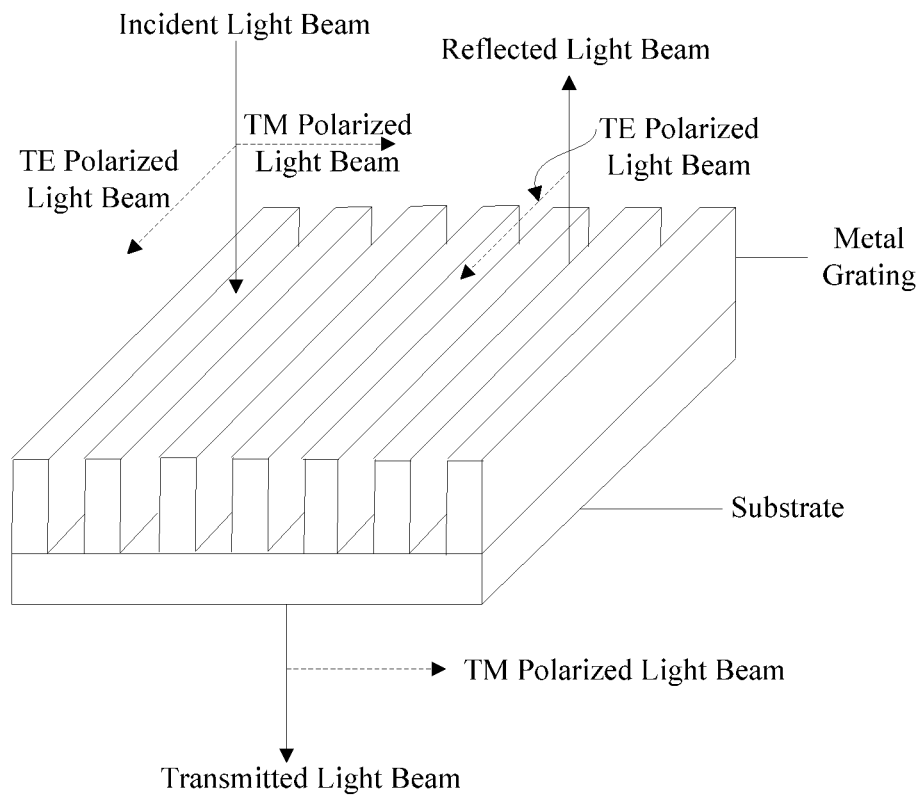
FIG. 1 is a schematic view showing a principle for a polarizer.

In the related art, when a metal grating is used by a polarizer, as shown in FIG. 1, an incident light beam may be divided into two polarized light beams in polarization directions perpendicular to each other, i.e., a transverse electric (TE) polarized light beam and a transverse magnetic (TM) polarized light beam. After the metal grating is used, the light beams mainly include the TM polarized beam, while the reflected light beams mainly includes the TE polarized beam. However, for a short-wavelength reflective polarizer including the metal grating, it is impossible to provide the metal grating with a sufficiently small size, and as a result, the polarization effect will be adversely affected.

Figure 2:
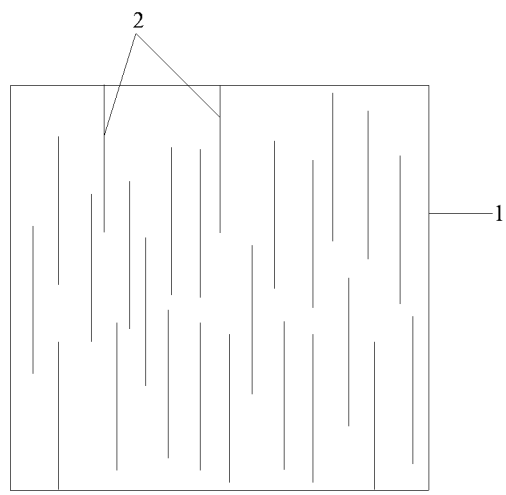
FIG. 2 is a plan view of a polarizer according to one embodiment of the present disclosure.
Figure 3:
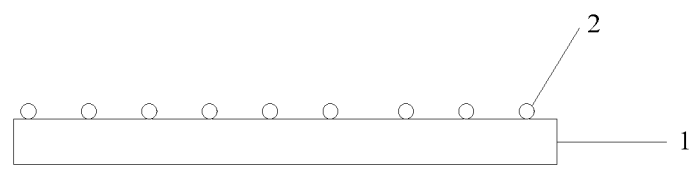
FIG. 3 is a sectional view of the polarizer according to one embodiment of the present disclosure.

The present disclosure provides in some embodiments a polarizer which, as shown in FIGS. 2-3, includes: a substrate 1, and a metal grating formed on the substrate 1 and including a metal nano-wire array 2 arranged in a predetermined direction.

According to the embodiments of the present disclosure, the metal nano-wire array 2 arranged in the predetermined direction is made of a nano material, and due to the nano material, the metal nano-wire array 2 may function as the metal grating. Because a sufficient small distance may be provided between the metal nano-wires, it is able to provide the metal grating with a sufficiently small size, thereby to improve the polarization effect.

Alternatively, the metal nano-wire may be made of silver nano particles. Of course, it may also be made of copper, gold or aluminium nano particles.

Figure 4:
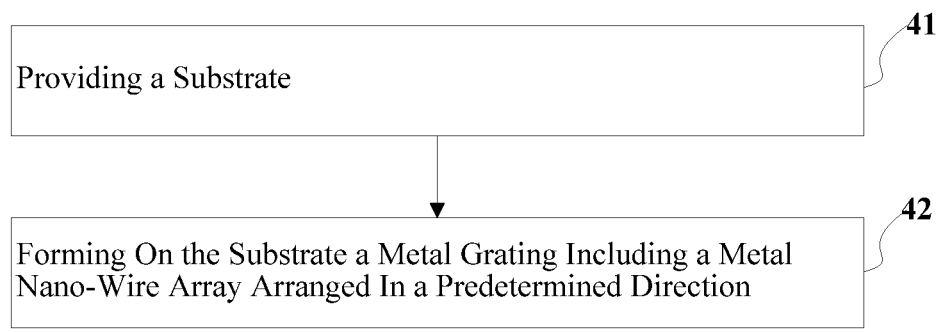
FIG. 4 is a flow chart of a method for manufacturing the polarizer according to one embodiment of the present disclosure.

The present disclosure further provides in some embodiments a method for manufacturing the polarizer which, as shown in FIG. 4, includes Step 41 of providing a substrate, and Step 42 of forming on the substrate a metal grating including a metal nano-wire array arranged in a predetermined direction.

Alternatively, the metal nano-wire may be generated by a chemical growth method. The following description is given by taking a reduction method as an example, where silver nano particles are used.

Silver nano particles may be generated from a silver nitrate solution, with ethylene glycol as a reducing agent. The generated silver nano particles are not stable enough, so polyvinyl pyrrolidone (PVP) may be further used as an aligning agent and a stabilizer. The metal nano-wire may be formed using the silver nano particles. Then, the generated metal nano-wire may be formed on the substrate 1 by spinning or printing.

Alternatively, the metal grating may be formed by the metal nano-wires in the following two modes.

<Mode 1> The metal nano-wire may be cured, and then drawn and aligned.

The metal nano-wire is formed in a liquid environment, so it may be cured at first, so as to form a solid metal nano-wire. Then, the solid metal nano-wire may be drawn and aligned, so as to form the metal grating including the metal nano-wire array 2 arranged in the predetermined direction. A conventional drawing process applicable to an iodine-contained polarizer may be used, and thus it will not be particularly defined herein.

In addition, in order to ensure the physical properties of the polarizer, a transparent protective film with high light transmittance, excellent water resistance and certain mechanical strength may be attached to an upper surface and a lower surface of the metal grating. Alternatively, the transparent protective film is made of triacetate cellulose (TAC) or polymethyl methacrylate (PMMA).

<Mode 2> The metal nano-wire is subjected to induced alignment under the effect of an electric field, and then cured.

In some embodiments, the metal nano-wire may be enclosed by a polarized organic material. It may be subjected to the induced alignment under the effect of an electric field, and then cured, so as to form the metal grating including the metal nano-wire array 2 arranged in the predetermined direction.

In addition, the present disclosure provides in some embodiments an alternative method for manufacturing the polarizer. At first, a transparent medium film doped with the metal nano-wire may be directly coated onto the substrate 1. In this way, it is unnecessary to generate the metal nano-wire through a chemical growth method and then provide the metal nano-wire on the substrate 1. Then, the metal nano-wire in the transparent medium film may be aligned in the predetermined direction, so as to form the metal grating including the metal nano-wire array 2 arranged in the predetermined direction. During the alignment, the metal nano-wire may be cured and then stretched and aligned, or it may be subjected to the induced alignment under the effect of an electric field and then cured.

Alternatively, the transparent medium film is made of polyvinyl alcohol (PVA).

The present disclosure further provides in some embodiments yet another alternative method for manufacturing the polarizer. At first, a transparent alignment film having an alignment pattern may be coated onto the substrate 1, and the metal nano-wire may be generated in accordance with the alignment pattern through a chemical growth method. Alternatively, the transparent alignment film is made of PVP. When the PVP film has been coated onto the substrate 1, the metal nano-wire may be directly generated on the substrate 1 through a chemical growth method, so as to form the metal nano-wire array 2 in accordance with the alignment pattern. Then, the metal nano-wire may be cured, so as to form the metal grating.

According to the embodiments of the present disclosure, the metal nano-wire array is made of a nano material, so as to provide the metal grating with a sufficiently small size, thereby to improve the polarization effect. Further, a distance between the metal nano-wires may be controlled in accordance with a concentration of the nano material and an ink thickness during the printing. The larger the concentration and the ink thickness, the smaller the distance between the metal nano-wires.

The present disclosure further provides in some embodiments a display device including the above-mentioned polarizer.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A polarizer, comprising:
   a substrate; and
   a metal grating formed on the substrate and including a metal nano-wire array arranged in a predetermined direction,
   wherein metal nano-wires in the metal nano-wire array are doped in a transparent medium film, and the transparent medium film is made of polyvinyl alcohol (PVA).

2. The polarizer according to claim 1, wherein a transparent protective film is attached to at least one side of the metal grating, and the transparent protective film is made of triacetate cellulose (TAC) or polymethyl methacrylate (PMMA).

3. The polarizer according to claim 1, wherein a transparent alignment film having an alignment pattern is coated on the substrate.

4. The polarizer according to claim 3, wherein the transparent alignment film is made of polyvinyl pyrrolidone (PVP).

5. The polarizer according to claim 3, wherein the metal nano-wire array is formed on the substrate in accordance with the alignment pattern.

6. The polarizer according to claim 1, wherein the substrate is a base substrate, an array substrate or a color filter substrate.

7. The polarizer according to claim 1, wherein the metal nano-wire is made of silver, copper, gold or aluminum nano particles.

8. A display device, comprising the polarizer according to claim 1.

9. A method for manufacturing a polarizer, comprising steps of:
   providing a substrate; and
   forming on the substrate a metal grating including a metal nano-wire array arranged in a predetermined direction,
   wherein the step of forming on the substrate the metal grating including the metal nano-wire array in the predetermined direction comprises:
   coating a transparent medium film doped with metal nano-wires onto the substrate; and
   aligning the metal nano-wires in the transparent medium film in the predetermined direction, thereby forming the metal grating including the metal nano-wire array;
   wherein the transparent medium film is made of polyvinyl alcohol (PVA).

10. The method according to claim 9, wherein the step of forming on the substrate the metal grating including the metal nano-wire array arranged in the predetermined direction comprises:
    generating metal nano-wires through a chemical growth method;
    forming the metal nano-wires on the substrate through spinning or printing; and
    aligning on the substrate the metal nano-wires in the predetermined direction, thereby forming the metal grating including the metal nano-wire array arranged in the predetermined direction.

11. The method according to claim 10, wherein the step of aligning on the substrate the metal nano-wires in the predetermined direction, thereby forming the grating metal including the metal nano-wire array comprises:
    curing the metal nano-wires; and
    drawing and aligning the cured metal nano-wires, thereby forming the metal grating including the metal nano-wire array.

12. The method according to claim 10, wherein the step of aligning on the substrate the metal nano-wires in the predetermined direction, thereby forming the grating metal including the metal nano-wire array comprises:
    enclosing the metal nano-wires with a polarized organic material;
    subjecting the metal nano-wires to induced alignment under an effect of an electric field on the substrate; and
    curing the aligned metal nano-wires, thereby forming the metal grating including the metal nano-wire array.

13. The method according to claim 10, wherein the metal nano-wires are made of silver nano particles, and the step of generating the metal nano-wires through a chemical growth method comprises:
    generating the silver nano particles from a silver nitrate solution, with ethylene glycol as a reducing agent; and
    forming the metal nano-wires using the silver nano particles, with PVP as an aligning agent and a stabilizer.

14. The method according to claim 9, wherein the step of forming on the substrate the metal grating including the metal nano-wire array in the predetermined direction comprises:
    forming on the substrate a transparent alignment film having an alignment pattern;
    generating metal nano-wires on the substrate in accordance with the alignment pattern through a chemical growth method; and
    curing the metal nano-wires, thereby forming the metal grating including the metal nano-wire array.

15. The method according to claim 14, wherein the transparent alignment film is made of polyvinyl pyrrolidone (PVP).

16. The method according to claim 9, wherein a distance between metal nano-wires in the metal nano-wire array is controlled in accordance with a concentration of nano particles and an ink thickness during printing.

* * * * *